United States Patent
Katsunaga et al.

(10) Patent No.: US 12,151,832 B2
(45) Date of Patent: Nov. 26, 2024

(54) HEAT TRANSFER CONTROL STRUCTURE, FLYING OBJECT AND SPACECRAFT WITH HIGH HEAT RESISTANCE

(71) Applicant: MITSUBISHI HEAVY INDUSTRIES, LTD., Tokyo (JP)

(72) Inventors: Kenta Katsunaga, Tokyo (JP); Tadashi Inagaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 212 days.

(21) Appl. No.: 17/324,497

(22) Filed: May 19, 2021

(65) Prior Publication Data

US 2021/0362884 A1    Nov. 25, 2021

(30) Foreign Application Priority Data

May 25, 2020   (JP) ................. 2020-090904

(51) Int. Cl.
*B64G 1/58* (2006.01)
*B64G 1/64* (2006.01)
*F16L 59/12* (2006.01)

(52) U.S. Cl.
CPC .............. *B64G 1/58* (2013.01); *F16L 59/123* (2013.01); *B64G 1/641* (2013.01)

(58) Field of Classification Search
CPC .. B64G 1/58; B64G 1/50; B64G 1/641; F16L 59/12; F16L 59/123; F42B 15/34; F16B 5/0241; F16B 5/0088; F16B 5/02; F16B 5/025; F16B 5/04; Y10T 403/75
See application file for complete search history.

(56) References Cited

U.S. PATENT DOCUMENTS

| | | | | |
|---|---|---|---|---|
| 4,919,366 A * | 4/1990 | Cormier | ........... | B64C 1/38 220/592.21 |
| 6,102,610 A * | 8/2000 | Palusis | ........... | F02K 1/80 403/220 |
| 6,827,312 B2 * | 12/2004 | Riedell | ........... | B64G 1/58 244/133 |
| 8,056,862 B1 * | 11/2011 | Tomerlin | ........... | B64G 1/58 244/159.1 |
| 2009/0304438 A1 * | 12/2009 | Kolax | ........... | B64C 1/12 403/24 |

(Continued)

FOREIGN PATENT DOCUMENTS

| CN | 103029826 A | 4/2013 |
|---|---|---|
| CN | 105253290 A | 1/2016 |

(Continued)

OTHER PUBLICATIONS

Japan Patent Office, "Office Action for Japanese Patent Application 2020-090904," Oct. 3, 2023.

*Primary Examiner* — Philip J Bonzell
*Assistant Examiner* — Anna L. Gordon
(74) *Attorney, Agent, or Firm* — HAUPTMAN HAM, LLP

(57) ABSTRACT

A heat transfer control structure includes: an outer shell having an outer surface and an inner surface, the outer shell being heated by airflow along the outer surface; an inner shell disposed opposed to the inner surface of the outer shell, the inner shell being configured to accommodate a payload therein; and a plate coupled to the inner shell such that the plate is opposed to the inner shell across a gap. The outer shell is coupled to the plate.

16 Claims, 6 Drawing Sheets

(56) References Cited

U.S. PATENT DOCUMENTS

| | | | |
|---|---|---|---|
| 2010/0028074 A1* | 2/2010 | Etling | F16B 5/0657 |
| | | | 403/24 |
| 2010/0307162 A1* | 12/2010 | Bottcher | F23M 5/04 |
| | | | 60/752 |
| 2012/0318922 A1 | 12/2012 | Saito et al. | |
| 2017/0264015 A1 | 9/2017 | Stratis et al. | |
| 2019/0078599 A1* | 3/2019 | Pinney | F02K 1/822 |
| 2020/0049474 A1 | 2/2020 | Quertelet et al. | |

FOREIGN PATENT DOCUMENTS

| | | | | |
|---|---|---|---|---|
| CN | 110626011 A | * | 12/2019 | |
| EP | 3219994 A1 | * | 9/2017 | ............ B62D 27/02 |
| JP | S58-119097 U | | 8/1983 | |
| JP | H04-019300 A | | 1/1992 | |
| JP | H09-207900 A | | 8/1997 | |
| JP | H10-035597 A | | 2/1998 | |
| JP | 2000-335500 A | | 12/2000 | |
| JP | 2001-123641 A | | 5/2001 | |
| JP | 2011-183922 A | | 9/2011 | |
| JP | 2014-184875 A | | 10/2014 | |
| JP | 2017-138072 A | | 8/2017 | |
| JP | 2020-517881 A | | 6/2020 | |
| WO | 2018/193170 A1 | | 10/2018 | |

\* cited by examiner

HEAT TRANSFER CONTROL STRUCTURE, FLYING OBJECT AND SPACECRAFT WITH HIGH HEAT RESISTANCE

CROSS REFERENCE

This application claims priority of Japanese Patent Application No. 2020-090904, filed on May 25, 2020, the disclosure of which is incorporated herein by reference.

TECHNICAL FIELD

The present invention relates to a heat transfer control structure, a flying object, and a spacecraft, more particularly, a technology to protect equipment mounted in a flying object and a spacecraft from high temperature.

BACKGROUND

The surface of a flying object configured to fly at high speed in the air and the surface of a spacecraft launched to the cosmic space may become hot. For example, the surface of the flying object may become hot due to aerodynamic heating. Further, the surface of the spacecraft may become hot, for example, due to heat from the sun. A flying object and a spacecraft may carry a payload incorporating equipment that is not heat resistant. It is desired that such payload is protected from high temperature.

Accordingly, there is a technical need for providing a technology to protect a payload mounted in a flying object or a spacecraft from high temperature.

It is noted that Japanese patent application publication No. 2001-123641 A discloses an exterior panel with superior thermal insulation.

SUMMARY

Accordingly, an objective of the present invention is to provide a technique for protecting a payload mounted in a flying object or a spacecraft from high temperature. Other objectives of the present invention would be understood by persons skilled in the art from the following disclosure.

In an aspect of the present invention, a heat transfer control structure includes: an outer shell having an outer surface and an inner surface, the outer shell being heated by airflow along the outer surface; an inner shell disposed opposed to the inner surface of the outer shell, the inner shell being configured to accommodate a payload therein; and a plate coupled to the inner shell such that the plate is opposed to the inner shell across a gap. The outer shell is coupled to the plate.

In one embodiment, the inner shell and the plate may be coupled together with a spacer member disposed between the inner shell and the plate.

In one embodiment, the plate may be coupled to the outer shell with a screw.

In one embodiment, the heat transfer control structure may include an insert coupled to the outer shell, the insert having an internal thread. The plate may be coupled to the outer shell with an external thread of the screw screwed into the internal thread of the insert.

In one embodiment, the heat transfer control structure may further include a tubular collar disposed between the plate and the insert. In such embodiment, the screw may be inserted into the internal thread of the insert, the screw passing through a through hole disposed through the plate and an internal space of the collar. In a preferred embodiment, the collar is disposed apart from the screw.

In one embodiment, a coupling member that couples the plate to the inner shell is disposed external to the collar.

In one embodiment, the outer shell may have a boss that protrudes from the inner surface, and the insert may be inserted in a recess disposed on the boss.

In one embodiment, the insert may be formed of material different from that of the outer shell.

In another aspect of the present invention, a flying object includes a body and a fairing coupled to a forward end of the body. The fairing includes: an outer shell having an outer surface and an inner surface, the outer shell being heated by airflow along the outer surface; an inner shell disposed opposed to the inner surface of the outer shell, the inner shell being configured to accommodate a payload therein; and a plate coupled to the inner shell such that the plate is opposed to the inner shell across a gap. The outer shell is coupled to the plate.

In still another aspect of the present invention, a spacecraft includes: an outer shell; an inner shell disposed opposed to an inner surface of the outer shell, the inner shell being configured to accommodate a payload therein; and a plate coupled to the inner shell such that the plate is opposed to the inner shell across a gap. The outer shell is coupled to the plate.

The present invention provides a technique for protecting a payload mounted in a flying object or a spacecraft from high temperature.

DETAILED DESCRIPTION

Figure 1:
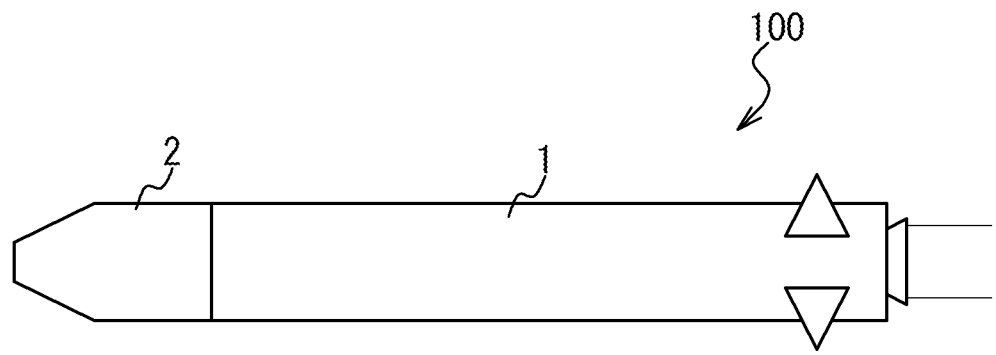
FIG. 1 is a side view schematically illustrating an example configuration of a flying object, according to one embodiment.

FIG. 1 is a side view schematically illustrating an example configuration of a flying object 100, according to one embodiment. The flying object 100 includes a body 1 that incorporates an engine configured to produce propulsion and a fairing 2 coupled to the forward end of the body 1. The fairing 2 is configured to accommodate therein desired equipment while controlling airflow at and near the forward end of the flying object 100.

Figure 2:
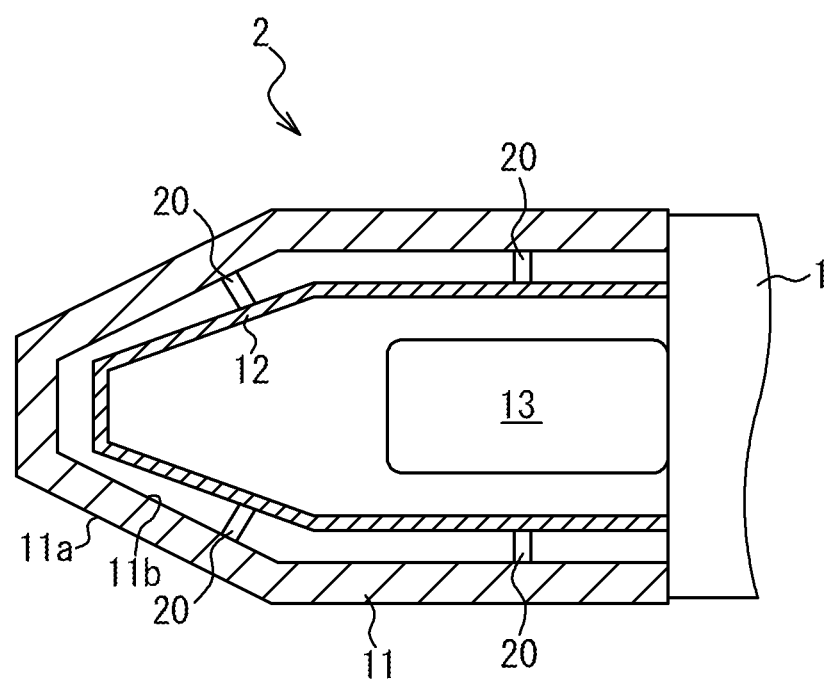
FIG. 2 is a partial section view schematically illustrating an example configuration of a fairing, according to one embodiment.

FIG. 2 is a partial section view schematically illustrating an example configuration of the fairing 2. The fairing 2 includes an outer shell 11 and an inner shell 12.

The outer shell 11 is configured as a structural member that retains the profile of the fairing 2. The functionality of controlling the airflow is mainly offered by the outer shell 11. When the flying object 100 flies, the airflow is controlled such that the air flows along the outer surface 11a of the outer shell 11. During the flight of the flying object 100, the outer shell 11 may become hot due to aerodynamic heating. As discussed below in detail, the fairing 2 also functions as a heat transfer control structure configured to suppress heat transfer from the outer shell 11 to the inner shell 12 and thereby protect the equipment accommodated in the inner shell 12 from the heat generated by the aerodynamic heating.

The inner shell 12 is coupled to the outer shell 11 with an inner shell retaining structure 20 such that the inner shell 12 is opposed to the inner surface 11b of the outer shell 11. The inner shell 12 accommodates a payload 13 in its internal space. The payload 13 may include equipment that is not resistant to high temperature. The inner shell 12 is configured to, when the outer shell 11 is heated by aerodynamic heating, suppress heat radiation from the outer shell 11 to protect the payload 13 from high temperature. To further suppress the heat radiation, the inner shell 12 may be formed of metal material in one embodiment.

In this embodiment, the fairing 2 is configured as follows. First, the inner shell retaining structure 20 is configured to have high strength. During a flight of the flying object 100, the inner shell 12 may be subjected to vibrations. The inner shell retaining structure 20 is designed to be tolerant to the vibrations. Further, the fairing 2 is configured to suppress heat transfer from the outer shell 11 to the inner shell 12 such that the inner shell 12 is kept at low temperature. If the inner shell 12 becomes hot, the temperature of the payload 13 may increase due to the heat radiation from the inner shell 12, weakening the protection of the payload 13. Further, the fairing 2 is configured such that the outer surface 11a of the outer shell 11 is shaped smoothly to provide the functionality of the airflow control. For example, it is undesirable that the inner shell retaining structure 20 includes a member that protrudes from the outer surface 11a of the outer shell 11. In this embodiment, the inner shell retaining structure 20 is configured to fulfill these requirements.

Figure 3:
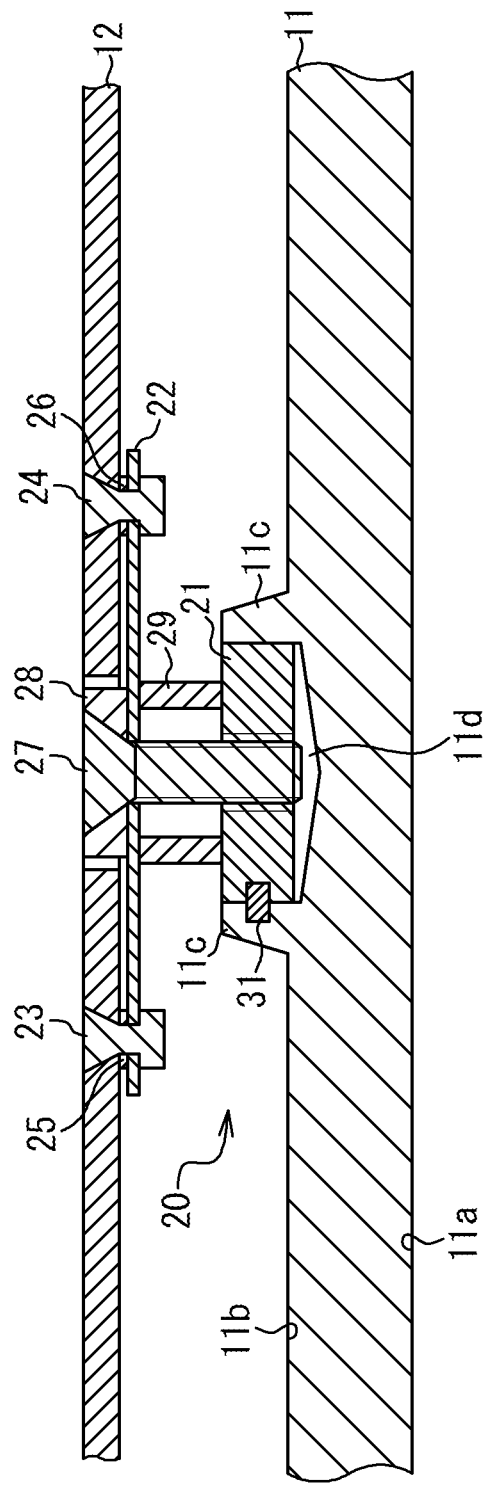
FIG. 3 is a section view illustrating an example configuration of an inner shell retaining structure of a fairing, according to one embodiment.
Figure 4:
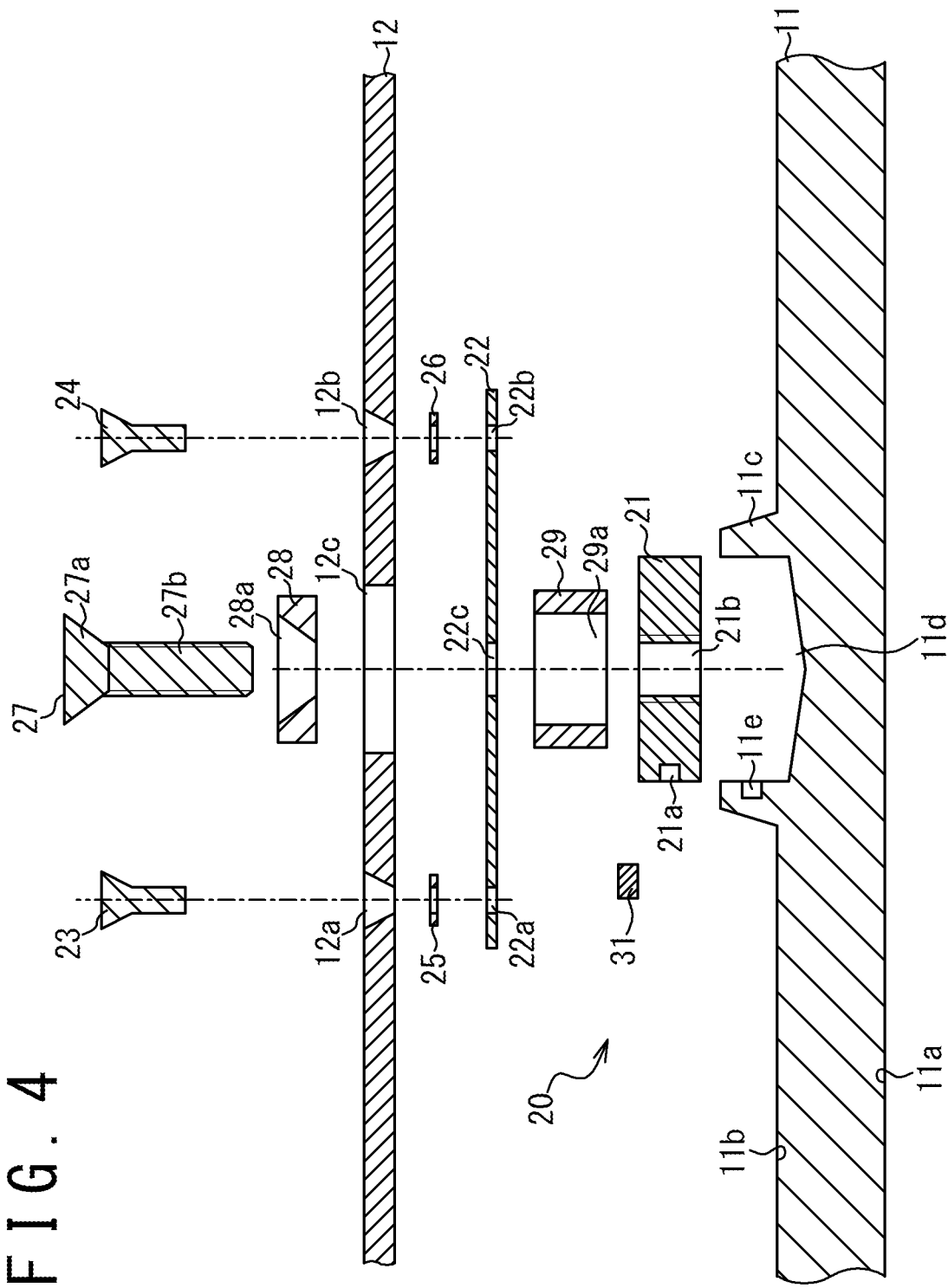
FIG. 4 is an exploded view illustrating an example configuration of the inner shell retaining structure illustrated in FIG. 3.

FIG. 3 is a section view illustrating an example configuration of the inner shell retaining structure 20 of the fairing 2, and FIG. 4 is an exploded view of the same. The inner shell retaining structure 20 includes an insert 21, a plate 22, rivets 23, 24, washers 25, 26, a screw 27, a washer 28, and a collar 29.

The insert 21 is coupled to the outer shell 11. In details, the outer shell 11 has a boss 11c that protrudes from the inner surface 11b, and the insert 21 is inserted into a recess 11d disposed on the boss 11c. In one embodiment, the insert 21 is coupled to the outer shell 11 by wedging, in the state in which the insert 21 is inserted in the recess 11d, an insert fixture key 31 into the space formed with the cutout 11e formed in the boss 11c and the cutout 21a formed in the insert 21. The insert 21 has an internal thread 21b that is screwed onto the external thread of the screw 27. In one embodiment, the insert 21 is formed from material that is different from the material of the outer shell 11. The insert 21 may be formed from material onto which a thread can be formed more easily than the material of the outer shell 11. Such configuration is especially useful in the case where the outer shell 11 is formed from material for which threading is difficult.

The plate 22 is coupled to the inner shell 12 with the rivets 23 and 24. The rivets 23 and 24 function as coupling members configured to couple the plate 22 to the inner shell 12. More specifically, the inner shell 12 has through holes 12a and 12b, and the plate 22 has through holes 22a and 22b. With the washers 25 and 26 disposed or sandwiched between the inner shell 12 and the plate 22, the rivet 23 is inserted into the through hole 12a, the washer 25, and the though hole 22a, and further the rivet 24 is inserted into the through hole 12b, the washer 26, and the though hole 22b. The plate 22 is coupled to the inner shell 12 through riveting with the rivets 23 and 24 in this state. FIG. 3 illustrates the shapes of the rivets 23 and 24 after the riveting and FIG. 4 illustrating the shapes of the rivets 23 and 24 before the riveting.

In this embodiment, the inner shell 12 and the plate 22 is apart from each other across a narrow gap as the washers 25 and 26 are disposed between the inner shell 12 and the plate 22. The washers 25 and 26, which have a thickness corresponding to the gap between the inner shell 12 and the plate 22, function as ring-shaped spacer members that hold the inner shell 12 apart from the plate 22. As described later in detail, the gap between the inner shell 12 and the plate 22 effectively suppresses heat transfer from the outer shell 11 to the inner shell 12.

The inner shell 12 has a through hole 12c through which the screw 27 is inserted, and the plate 22 has a through hole 22c through which the screw 27 is inserted.

The screw 27, the washer 28, and the collar 29 function as a coupling structure configured to couple together the outer shell 11 and the inner shell 12. More specifically, the screw 27 includes a head 27a and a body 27b on which an external thread is formed. The washer 28 has a hole 28a with a shape corresponding to the head 27a of the screw 27. The collar 29 is formed in a tubular shape (in this embodiment, in a cylindrical shape) having an internal space 29a penetrating therethrough.

The screw 27 is inserted into the internal thread 21b of the insert 21, passing through the hole 28a of the washer 28, the through hole 12c of the inner shell 12, the through hole 22c of the plate 22, and the collar 29, and the external thread of the body 27b of the screw 27 is screwed into the internal thread 21b. Although the screw 27 is inserted through the internal space 29a of the collar 29, the screw 27 is apart from the collar 29, not in contact with the collar 29. The inner shell 12 is coupled to the outer shell 11 by tightening the screw 27 against the insert 21 with the washer 28, the plate 22, and the collar 29 disposed between the head 27a of the screw 27 and the insert 21. The screw 27, which couples together the insert 21 and the plate 22, passes through the internal space 29a of the collar 29 while the rivets 23 and 24, which couples together the plate 22 and the inner shell 12, are located external to the collar 29.

The washer 28, which stabilizes the position of the head 27a of the screw 27, is clamped and fixed by the head 27a and the plate 22. In this embodiment, the washer 28 is fixed apart from the inner shell 12. As describe later in detail, this structure effectively suppresses heat transfer from the outer shell 11 to the inner shell 12. The washer 28 may be omitted depending on the shape of the head 27a of the screw 27.

The inner shell retaining structure 20 thus configured has a superior strength while offering improved heat insulation, effectively suppressing a temperature increase of the inner shell 12 when the outer shell 11 is heated by aerodynamic heating.

Figure 5:
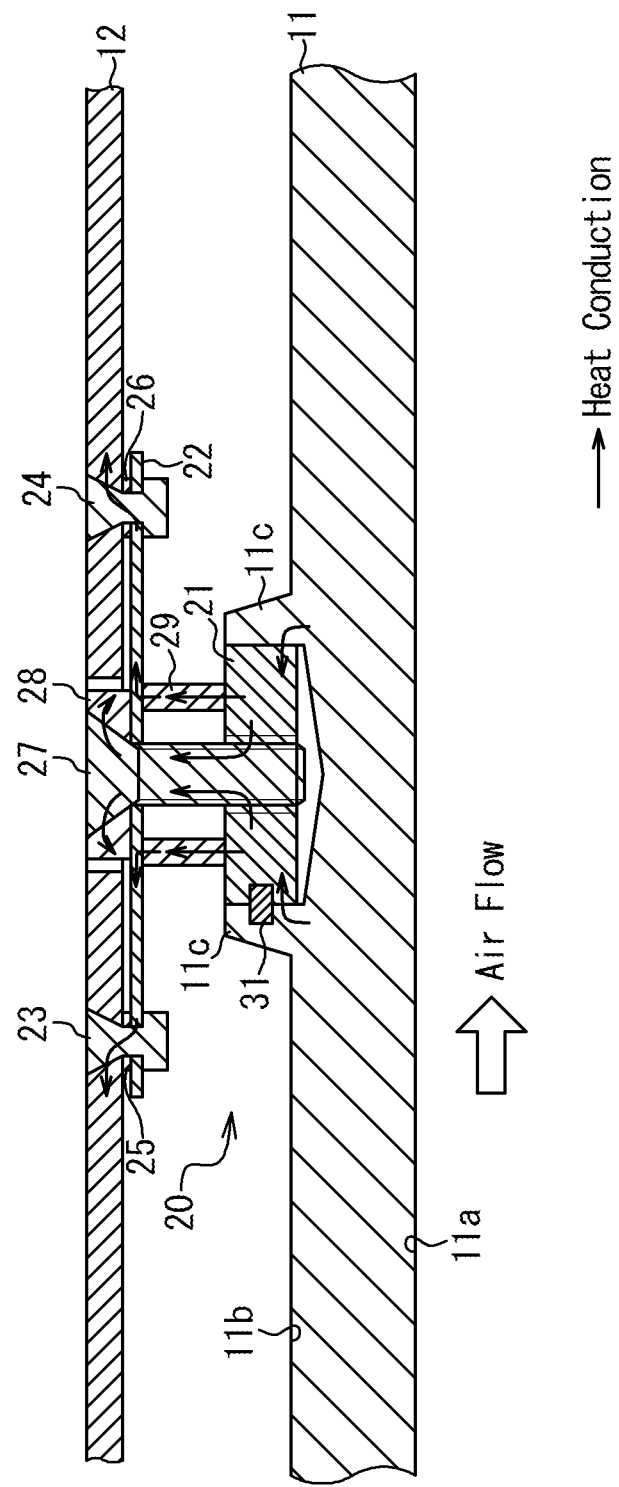
FIG. 5 is a section view illustrating example heat transfer in the inner shell retaining structure illustrated in FIG. 3.

FIG. 5 schematically illustrates heat transfer in the inner shell retaining structure 20. When the air flows along the outer surface 11a of the outer shell 11 to heat the outer shell 11 by aerodynamic heating, the heat is transferred from the outer shell 11 to the plate 22 via the insert 21, the screw 27 and the collar 29, and further to inner shell 12 via the rivets 23 and 24.

In the inner shell retaining structure 20 according to this embodiment, heat transfer paths that conduct the heat from the plate 22 to the inner shell 12 are limited to the rivets 23, 24 and the washers 25 and 26 since the inner shell 12 is apart from the plate 22 with the washers 25 and 26 disposed between the inner shell 12 and the plate 22 while the washer 28 is disposed apart from the inner shell 12. This lengthens the heat transfer paths in the inner shell retaining structure 20 according to this embodiment. Such structure increases the thermal resistance thereof, contributing to improved heat insulation. The configuration in which the rivets 23 and 24 are disposed external to the collar 29 and apart from the screw 27 also contributes to lengthening the heat transfer paths.

Further, the configuration in which the collar 29 is shaped tubular and disposed apart from the screw 27 allows enhancing the strength of the inner shell retaining structure 20 with improved heat insulation. The collar 29, which has the internal space 29a and is not solid, can be structured to reduce heat transfer. Meanwhile, the collar 29 can have a high strength by enlarging the gap between the screw 27 and the collar 29. In embodiments where the collar 29 is shaped cylindrical, for example, it is possible to provide the collar 29 with a sufficient strength with a reduced thickness by enlarging the radius of the collar 29.

As described above, the inner shell retaining structure 20 according to this embodiment offers improved heat insulation between the outer shell 11 and the inner shell 12 with a sufficient strength. This feature is advantageous for protecting the payload 13 from high temperature.

Figure 6:
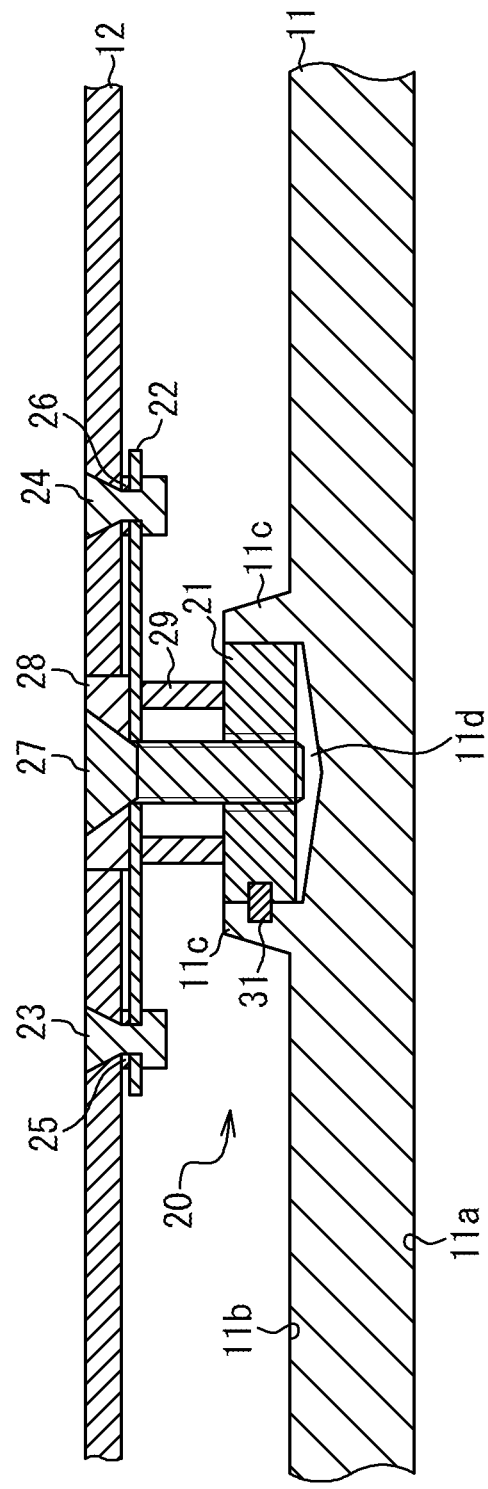
FIG. 6 is a section view illustrating a variation of the inner shell retaining structure.

In a variation illustrated in FIG. 6, the washer 28 is inserted into an opening formed through the inner shell 12, being in contact with the inner shell 12. This structure also increases the thermal resistances of routes from the outer shell 11 to the inner shell 12, improving heat insulation. From the viewpoint of heat insulation, however, it is preferable that the washer 28 is fixed apart from the inner shell 12 as illustrated in FIGS. 3 to 5.

Figure 7:
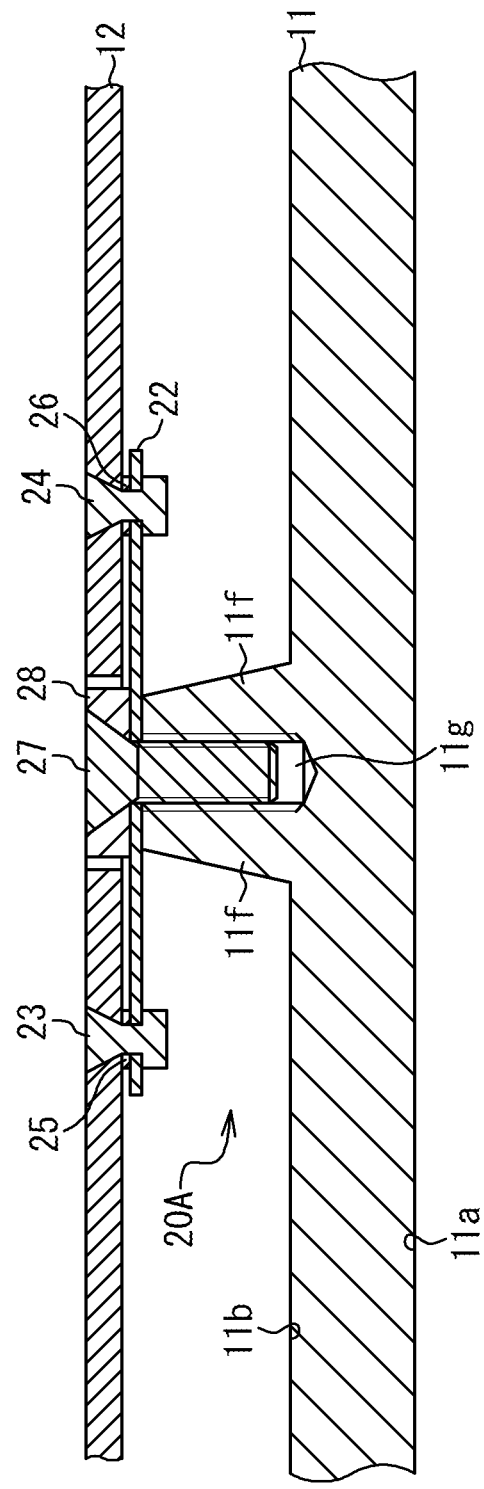
FIG. 7 illustrates an example configuration of an inner shell retaining structure of a fairing, according to an alternative embodiment.

FIG. 7 is a section view illustrating an example configuration of an inner shell retaining structure 20A in an alternative embodiment. In this embodiment, the outer shell 11 have a boss 11f that protrudes from the inner surface 11b. The boss 11f has an insertion cavity 11g into which the screw 27 is inserted. The insertion cavity 11g has an internal thread on the inner surface thereof. The inner shell 12 is coupled to the outer shell 11 with the external thread of the body 27b of the screw 27 screwed into the internal thread formed on the insertion cavity 11g. The rest of the inner shell retaining structure 20A illustrated in FIG. 7 is configured similarly to the inner shell retaining structure 20 illustrated in FIG. 3 and FIG. 4.

In the inner shell retaining structure 20A according to this embodiment, the inner shell 12 and the plate 22 are also disposed apart from each other with the washers 25 and 26 disposed between the inner shell 12 and the plate 22. Such configuration increases the thermal resistance, contributing to improved heat insulation between the outer shell 11 and the inner shell 12. Further, the configuration illustrated in FIG. 7 allows reducing the number of the components, although the thermal resistance between the outer shell 11 and the plate 22 is smaller than that in the configuration illustrated in FIG. 3.

While embodiments of the fairing 2 of the flying object 100 have been described in the above, the configurations of the above-described embodiments, which are superior in the strength and the heat insulation, are also useful as heat insulation structures of spacecrafts. In embodiments where any of the configurations recited in the above-described embodiments is used as a heat insulation structure of a spacecraft, the inner shell 12 is coupled to the outer shell 11 with the inner shell retaining structure 20 and a desired payload 13 is accommodated in the internal space of the inner shell 12. It is noted that, as for use for a spacecraft, the outer shell 11 may not be necessarily structured as a structural member. It is also noted that, for use in the cosmic space in which no air exists, the outer shell 11 may not have the function as an airflow control member.

While embodiments of the present invention have been specifically described in the above, the present invention must not be construed as being limited to the above-described embodiments. Persons skilled in the art would appreciate that the present invention may be implemented with various modifications.

What is claimed is:

1. A heat transfer control structure, comprising:
    an outer shell having an outer surface and an inner surface, the outer shell being heated by airflow along the outer surface;
    an inner shell disposed opposed to the inner surface of the outer shell, the inner shell being configured to accommodate a payload therein; and
    a plate coupled to the inner shell such that the plate is opposed to the inner shell across a gap,
    wherein the outer shell is coupled to the plate,
    wherein the outer shell is a member that is physically separate from the plate,
    wherein the plate is disposed between the outer shell and the inner shell, and directly faces the outer shell and the inner shell with an empty space therebetween,
    wherein the plate is coupled to the outer shell with a screw,
    wherein the heat transfer control structure further comprises a washer having a hole through which the screw is inserted,
    wherein the inner shell has a through hole in which the washer is inserted,
    wherein the washer is disposed between a head of the screw and the plate,
    wherein the washer is in contact with a surface of the plate, the surface being opposed to the inner shell, and
    wherein the washer is fixed apart from the inner shell.

2. The heat transfer control structure according to claim 1, wherein the outer shell is configured to control the airflow along the outer surface of the outer shell.

3. The heat transfer control structure according to claim 1, wherein the inner shell and the plate are coupled together with a spacer member disposed between the inner shell and the plate.

4. The heat transfer control structure according to claim 1, further comprising: an insert coupled to the outer shell, the insert having an internal thread,
    wherein the plate is coupled to the outer shell with an external thread of the screw screwed into the internal thread of the insert.

5. The heat transfer control structure according to claim 4, further comprising a tubular collar disposed between the plate and the insert,
    wherein the screw is inserted into the internal thread of the insert, the screw passing through a through hole disposed through the plate and an internal space of the tubular collar.

6. The heat transfer control structure according to claim 5, wherein the tubular collar is disposed apart from the screw.

7. The heat transfer control structure according to claim 5, further comprising a coupling member that couples the plate to the inner shell, the coupling member being disposed external to the tubular collar.

8. The heat transfer control structure according to claim 4, wherein the outer shell comprises a boss that protrudes from the inner surface, and
wherein the insert is inserted in a recess disposed on the boss.

9. The heat transfer control structure according to claim 8, wherein the insert is formed of material different from that of the outer shell.

10. The heat transfer control structure according to claim 1, wherein the plate is separated from the inner shell and is attached thereto to form the empty space therebetween,
said heat transfer control structure further comprising the screw connecting the plate with a boss of the outer shell so that the inner shell is spaced from the outer shell, and is attached to the outer shell through the plate with the empty space between the inner shell and the plate.

11. A flying object, comprising:
a body; and
a fairing coupled to a forward end of the body,
wherein the fairing comprises:
an outer shell having an outer surface and an inner surface, the outer shell being heated by airflow along the outer surface;
an inner shell disposed opposed to the inner surface of the outer shell, the inner shell being configured to accommodate a payload therein; and
a plate coupled to the inner shell such that the plate is opposed to the inner shell across a gap,
wherein the outer shell is coupled to the plate,
wherein the outer shell is a member that is physically separate from the plate,
wherein the plate is disposed between the outer shell and the inner shell, and directly faces the outer shell and the inner shell with an empty space therebetween,
wherein the plate is coupled to the outer shell with a screw,
wherein the flying object further comprises a washer having a hole through which the screw is inserted,
wherein the inner shell has a through hole in which the washer is inserted,
wherein the washer is disposed between a head of the screw and the plate,
wherein the washer is in contact with a surface of the plate, the surface being opposed to the inner shell, and
wherein the washer is fixed apart from the inner shell.

12. The flying object according to claim 11, wherein the outer shell is configured to control the airflow along the outer surface of the outer shell.

13. The flying object according to claim 11, wherein the inner shell and the plate are coupled together with a spacer member disposed between the inner shell and the plate.

14. The flying object according to claim 11, further comprising an insert coupled to the outer shell, the insert having an internal thread,
wherein the plate is coupled to the outer shell with an external thread of the screw screwed into the internal thread of the insert.

15. The flying object according to claim 14, further comprising a tubular collar disposed between the plate and the insert,
wherein the screw is inserted into the internal thread of the insert, the screw passing through a through hole disposed through the plate and an internal space of the tubular collar.

16. A spacecraft, comprising:
an outer shell;
an inner shell disposed opposed to an inner surface of the outer shell, the inner shell being configured to accommodate a payload therein; and
a plate coupled to the inner shell such that the plate is opposed to the inner shell across a gap,
wherein the outer shell is coupled to the plate,
wherein the outer shell is a member that is physically separate from the plate,
wherein the plate is disposed between the outer shell and the inner shell, and directly faces the outer shell and the inner shell with an empty space therebetween,
wherein the plate is coupled to the outer shell with a screw,
wherein the spacecraft further comprises a washer having a hole through which the screw is inserted,
wherein the inner shell has a through hole in which the washer is inserted,
wherein the washer is disposed between a head of the screw and the plate,
wherein the washer is in contact with a surface of the plate, the surface being opposed to the inner shell, and
wherein the washer is fixed apart from the inner shell.

* * * * *